Oct. 20, 1970  L. ROSEN  3,535,013
FOCUSED IMAGE HOLOGRAPHY WITH EXTENDED SOURCES
Filed Oct. 20, 1967
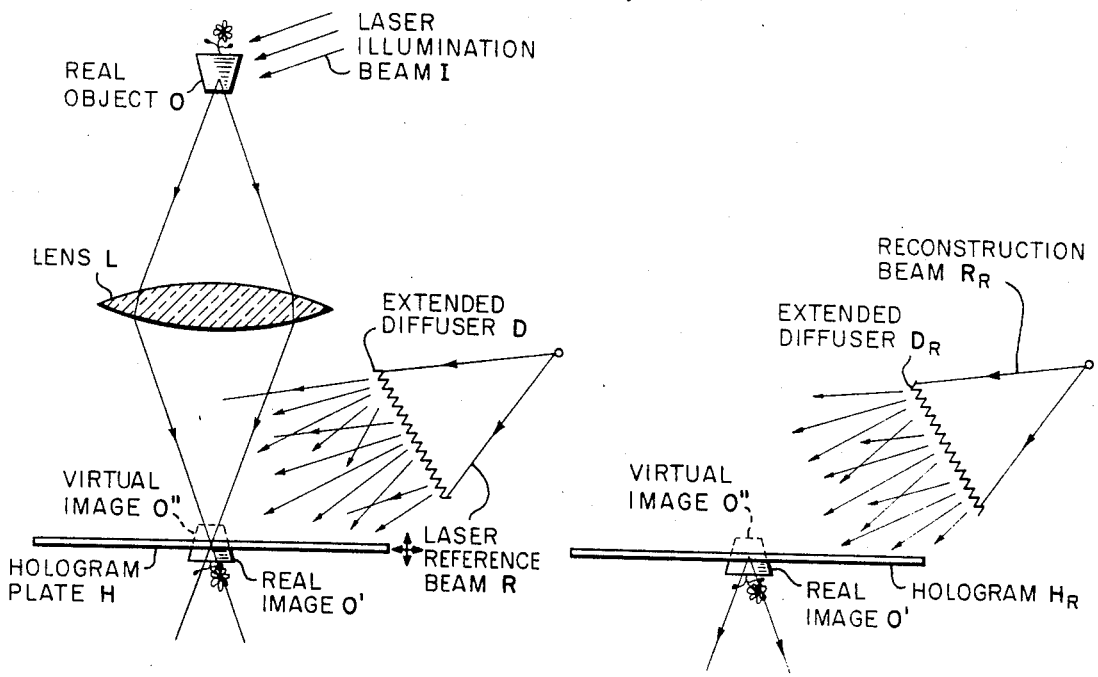
FIG. 1.
FIG. 2.
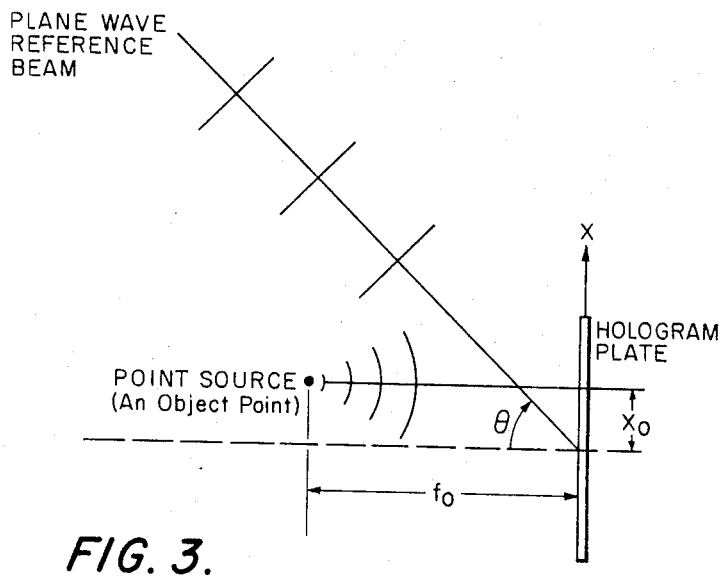
FIG. 3.
LOWELL ROSEN
INVENTOR.
BY
ATTORNEYS

United States Patent Office 3,535,013
Patented Oct. 20, 1970

3,535,013
FOCUSED IMAGE HOLOGRAPHY WITH EXTENDED SOURCES
Lowell Rosen, Winchester, Mass., assignor to the United States of America as represented by the Administrator of the National Aeronautics and Space Administration
Filed Oct. 20, 1967, Ser. No. 677,508
Int. Cl. G02b 27/22
U.S. Cl. 350—3.5      2 Claims

ABSTRACT OF THE DISCLOSURE

Holograms of real objects and focused aerial images using a coherent extended reference source illuminating the photographic plate can readily be made. During the recording process, a ground glass is placed between a point source laser reference beam and the holographic plate. On reconstruction, a different extended source or point source can be used. Also, on reconstruction, hologram or reference source misalignment is not critical.

ORIGIN OF THE INVENTION

The invention described herein was made by an employee of the U.S. Government and may be manufactured and used by or for the Government of the United States of America for governmental purposes without the payment of any royalties thereon or therefore.

BACKGROUND OF THE INVENTION

This invention relates in general to optical systems, and more particularly, to a method and means for recording and reconstructing holograms of real objects and aerial images of real objects.

Holography is a method of image formation with wavefronts reconstructed by means of special photographic transparencies called holograms. Whereas conventional photography records a recognizable image of the object, holography records the reflected light waves themselves, an unrecognizable array of blobs, specks and whorls. Also, whereas the ordinary photographic film causes images of a three-dimensional scene to be collapsed into a single plane, a hologram maintains the three-dimensional properties of the image by means of the reference wave which is simultaneously recorded on the photographic film.

The technique of wavefront reconstruction, holography, had its conception in the spatial filter work of Ernest Abbe in 1896; its birth in the one-beam or on-line technique of Dennis Gabor; its adolescence in the two-beam technique permitted by the development of the laser; and is now in its incipient adulthood.

An important advantage of a hologram over an ordinary photographic film is that a hologram records far more information and thereby provides a realism unattainable by any other means. Holograms are characterized by high resolution and large depth of field. The reconstructed images have several unique properties. For example, they have a three-dimensional quality which exhibits parallax and perspective just as any solid object would. An observer can see around the image by moving his head. Also, since light from each part of the object covers the entire area of the hologram plate, even a small portion of the plate contains information from all of the object. Thus, if the plate were broken or blemished, any small portion of the plate will reconstruct the object completely with only a loss in detail.

Because of these advantages holographic recording of an object has great utility in the fields of engineering, applied physics, and mathematics in a wide range of problems. For example, holograms are useful in studying moving objects such as the particle density in gases and plasmas, in communication systems, in character recognition systems, as information coding devices, in interferometry, in display systems, etc.

As the technique of wavefront reconstruction is now most often used, an object is illuminated by coherent light from a laser. A photographic plate receives "unfocused" light reflected from or transmitted through the object. Also, a reference beam is incident upon the plate such that the object does not interfere with the coherent reference beam. The object-scattered waves interact with the reference waves producing fringe patterns embodying both the amplitude and the phase from the light reflected from the object. The photographic plate is then developed chemically in a conventional manner. When the hologram is placed in a coherent light beam the reconstructed waves are indistinguishable from the original waves—even though the object has long since been removed.

A manner in which the above-described technique is improved is by the use of a diffusing medium in recording and reconstructing holograms. Heretofore, the diffusing medium has been used in coding and in source compensation applications wherein the diffuser is placed between the object and the hologram plate on recording, and wherein the diffuser is placed between the hologram plate and the image on reconstruction. However, this technique has two major limitations. First, the same diffuser that was used for making the hologram must be used to reconstruct the hologram. Second, the hologram cannot be reconstructed unless the object and reference source are in the same precise positions on recording. This positioning is very difficult because, for example, there are six degrees of freedom (three of translation and three of rotation) for the diffuser location.

OBJECTIVES AND SUMMARY OF THE INVENTION

An object of this invention is to provide a method and for recording and reconstructing holograms of real objects or the aerial images of real objects utilizing a coherent extended reference source.

Another object of this invention is to provide a method and means for recording a hologram which can be then reconstructed by a coherent extended source which is different from the reference source used on recording.

And still another object of this invention is to provide a method and means for making holograms which can be reconstructed by a coherent point source of electromagnetic radiation.

And a further object of this invention is to provide apparatus which is insensitive to hologram or source misalignment during the reconstruction process.

To the accomplishment of the foregoing objects, the present invention comprehends the utilization of a diffusing medium in the recording process. The diffuser is located between a coherent laser point source and a photographic plate. In this manner holograms can be made of real objects or the aerial image of real objects. Also, these holograms can then be reconstructed with a point source or with an extended reconstruction source which can be different from the reference source used in the recording process. The holograms recorded and reconstructed by the instant apparatus have minimum color blurring, and are also insensitive to any misalignment of the hologram or the reconstructing source during the reconstruction process.

BRIEF DESCRIPTION OF THE DRAWINGS

The novel features that are considered characteristic of this invention are set forth with particularity in the appended claims. The invention, both as to its organization and mode of operation, as well as additional objectives and advantages thereof, will best be understood from the following description when read in connection with the accompanying drawings, wherein:

FIG. 1 is a diagram of the instant technique utilizing an extended coherent reference beam for recording the hologram of an aerial image straddling a photographic plate;

FIG. 2 is a diagram of the instant technique utilizing an extended coherent reconstruction beam for reconstructing a hologram; and, FIG. 3 is a diagram of the recording of a hologram of an object point source with a plane wave reference beam and is useful for explaining the uncritical, geometrical nature of the instant extended source hologram.

DESCRIPTION OF THE PREFERRED EMBODIMENT

As shown in FIG. 1, in diagrammatic form, is the apparatus used for recording a focused image hologram. As shown in FIG. 1, a real object O is illuminated by a coherent laser beam I (which may typically be 6328 A. light from a helium-neon pulsed or continuous wave gas laser). Any other suitable coherent light source may be used. Light reflected from the real object O is caused by a lens L to form real image O' and a virtual image O'', which, as shown in FIG. 1, straddles a hologram plate H.

By using a high quality lens at unity magnification, the aerial image is essentially as good an object as the real object ahead of the lens. The aerial image does not have to straddle the photographic plate; the aerial image may be placed as close in front of or in back of the plate as is desired. If an observer wishes to view the hologram for a true three-dimensional effect then the lens L must have an optical aperture on the order of about 5 inches so that both eyes of the observer can be employed in viewing the reconstructed image.

An extended diffuser D is interposed at an off-axis location (typically 30°–50° from the normal to the photographic plate) between a coherent laser point source R and the hologram plate H. The diffuser D is typically a piece of ground glass (about 4 inches by 5 inches) and causes random phase variations, spatially but not temporally, in the wavefront reaching the hologram plate H.

After the proper exposure time, the holographic plate H (typically a 4 by 5 inch plate having a Kodak 649F emulsion) is developed chemically in a conventional manner. The developed hologram is then reconstructed, as shown in FIG. 2.

Shown in FIG. 2 is a diagram of the apparatus used for the reconstruction of the focused image hologram (recorded as shown in FIG. 1 wherein the aerial image straddled the plate). On reconstruction, that part of the image O' appearing on the side of a recorded plate $H_R$ closest to the observer is a real image. And that part of the image O'' appearing on the other side of the plate $H_R$ is a virtual image. It is important to note that in FIG. 2, the extended diffuser $D_R$ can be different from the diffuser D used in the recording process, and it may even be a point source. Also, the reconstruction beam $R_R$ does not need to be a laser; the beam $R_R$ can even be a flashlight source or other incoherent source. High quality reconstructions have been obtained even though the hologram $H_R$ and the reconstructing beam $R_R$ were misaligned by as much as 20–40° off the normal compared with the recording positions.

The uncritical nature of the instant extended source can be demonstrated mathematically in a very simple way. Consider the recording of a hologram of a single object point with an off-axis plane wave as illustrated in FIG. 3. If the reference wave has the form $$E_s(X) = A_s \exp[-i(2\pi/\lambda)X \sin \theta] \quad (1)$$

and the object point wave form $$E_0(X) = A_0 \exp[i(\pi/\lambda f_0)(X-X_0)^2] \quad (2)$$

then the transmission of the recorded hologram will be $T(X)$ where $$T(X) = K(A_0^2 + A_s^2) + KA_0A_s \exp i[(\pi/\lambda f_0)(X-X_0)^2 + (2\pi/\lambda)X \sin \theta]$$
$$+ KA_0A_s \exp -i[(\pi/\lambda f_0)(X-X_0)^2 + (2\pi/\lambda)X \sin \theta] \quad (3)$$

(K is a parameter characteristic of the film.)

When the hologram is illuminated with a plane wave source having the form $$E_r(X) = A_r \exp[-i(2\pi/\lambda)X \sin \psi] \quad (4)$$

The output wave front is then $E_0(X)$ where $$E_0(X) = E_r(X) T(X) \quad (5)$$

By carrying out the above multipilcation and simplifying the resulting expressions, a term is obtained representing the virtual image reconstruction, $E_{0v}(X)$ which has the following form $$E_{0v}(X) = C \exp(i\pi/\lambda f_0)$$
$$x[(X-X_0)^2 + 2f_0X(\sin \theta - \sin \psi)] \quad (6)$$

This is simply the reconstruction of a point source [as represented in Eq. 2] deflected from its original position ($X=X_0$) through an angle $\lambda$ where $$\sin \gamma = \sin \theta - \sin \psi \quad (7)$$

Now assume that the reconstruction is with an extended source though the hologram was recorded with a point source reference beam (as in FIG. 1). Then associated with $\psi$, is not a single value but a range of values extending from a $\psi$-min. to some $\psi$-max. As a result the point source reconstruction of Eq. 6 undergoes a deflection, not through a single angle $\gamma$ but through a range of $\gamma$'s depending on the particular choice of $\psi$. If this angle spread in $\gamma$ is denoted by $\Delta\gamma$ and if the object point was initially a distance $f_0$ from the hologram plate then the object point is seen to be "smeared" out in the reconstruction a distance $s$ where $$s = f_0 \Delta\gamma \quad (8)$$

As $f_0$ tends to zero (the limit of the object point moving onto the hologram plate) the "smear," $s$, tends to zero and an ordinary two-dimensional image is recorded on the hologram plate. A similar argument applies to the case of an extended source used in the recording process.

Physically, placing an object point close to the hologram plate or onto it (by means of an imaging system) creates with the reference wave a small diffraction zone plate. This zone plate gets progressively smaller as the object point approaches the hologram and as a result any phase variation of the light wavefront across it in the reconstruction, due to an extended source, becomes less important. For object points somewhat away from the hologram plate, phase relations between adjacent image points become more important, and the reconstruction quality depends upon the matching of the wavefront used in the reconstruction with the wavefront used as a reference in the recording process.

Based on the above analysis it has been found that when a real object is positioned with respect to the photographic plate by a distance three to four times closer than the distance between the plate and the extended diffuser, blurring is highly reduced.

Additionally, on reconstruction, a unique type of white-light "single-color" reconstruction by transmission of light from a point source of white-light through the hologram recorded by the arrangement of FIG. 1 has been observed. The explanation of this may be due to the fact that the luminous points of the scene recorded are quite close to the holographic plate (notably for demagnified images); hence it is largely the central portions of the individual zone plates formed by the luminous points and the reference wave which are recorded. In the usual hologram the angular separation between the reference beam and the light from the scene causes only the off-center sections of the zone plates to be recorded; these exhibit a much larger chromatic effect than the more central sections do.

Accordingly, there has been shown and described herein a novel, useful and improved method and means for allowing holograms to be made using an extended coherent reference beam source for recording, which holograms can be reconstructed by a different coherent extended reconstruction source or by even a point source.

A feature of the invention is that it now becomes possible to record holograms of real object or optical images of real objects without the need for an accurate plane wave or spherical wave reference beam.

Another feature of the invention is the ability to use a different extended or point source during the reconstruction process.

Still another feature of the invention is the insensitivity of the method to any misalignment of the hologram or the reconstruction source during the reconstruction process.

And a further feature of the invention is the ability to reconstruction a hologram with very little color blurring when a broadband light source (white light) is used in the reconstruction.

The specific embodiment described herein is intended to be merely illustrative and not restrictive of the invention. Various modifications in changes and form and detail will be obvious to those skilled in the art. For example, any type of diffusing medium can be used to form the extended source such as a piece of opal glass, a piece of translucent mineral matter, colloidal solutions, or any other type of geometrical arrangement that changes the spatial phase values of the wavefront and spreads the reference beam over a large area. It is therefore intended in the appended claims to cover all such changes and modifications as fall within the true spirit and scope of the invention.

What is claimed is:
1. The method of recording and reconstructing holograms of a real object comprising the steps of:
   illuminating said object with a point source of coherent light,
   focusing said light with a lens to form an aerial image of said object,
   positioning a planar photographic recording medium sensitive to said light in a plane contiguous to said image and normal to the optical axis of said lens,
   illuminating said recording medium with an extended reference source of light temporally coherent with said point source of coherent light, said reference source being positioned off-axis with respect to the normal to said recording medium,
   performing both said illuminating steps simultaneously so as to form a focused image hologram in said recording medium,
   illuminating said recorded hologram with an extended reconstruction source of coherent light different from said extended reference source with respect to its spatial coherence characteristics, said reconstruction source being positioned with respect to said recorded hologram at a position substantially duplicating the relative position of said reference source and said recording medium during the recording steps,
   whereby an image is reconstructed from said hologram without the need for using a reconstruction source that is identical to the reference source and that is insensitive to hologram and source misalignment.
2. The method of claim 1 in which the step of illuminating the recording medium with an extended reference source comprises
   positioning a reference point source of light mutually coherent with said point source of light illuminating said object at an off-axis position and
   interposing a diffusing medium between said reference point source and said recording medium.

References Cited

Stroke et al., Physics Letters, vol. 18, No. 3, September 1965, pp. 274–5.

Leith et al., Jour. of the Optical Soc. of Am., vol. 54, No. 4, April 1966, p. 523.

Kock et al., Proceedings of the IEEE, vol. 55, No. 1, January 1967, pp. 80–81.

DAVID SCHONBERG, Primary Examiner

R. J. STERN, Assistant Examiner